Sept. 22, 1925.

E. J. MURPHY

INDICATOR

Filed Oct. 30, 1923

1,554,685

Inventor:
Edwin J. Murphy,
by
His Attorney.

Patented Sept. 22, 1925.

1,554,685

UNITED STATES PATENT OFFICE.

EDWIN J. MURPHY, OF SCHENECTADY, NEW YORK, ASSIGNOR TO GENERAL ELECTRIC COMPANY, A CORPORATION OF NEW YORK.

INDICATOR.

Application filed October 30, 1923. Serial No. 671,743.

*To all whom it may concern:*

Be it known that I, EDWIN J. MURPHY, a citizen of the United States, residing at Schenectady, in the county of Schenectady, State of New York, have invented certain new and useful Improvements in Indicators, of which the following is a specification.

My invention relates to indicators, and has for its object the provision of a system of markings on the moving member of an indicator whereby the direction in which the moving member must be moved to be brought back to zero may be easily and quickly determined, and also the approximate distance of the moving member from zero.

My invention has general application to the moving members of indicators which it is desired to turn to zero position, as for instance in systems for moving a controlled object in accordance with the movements of a controlling object, wherein an indicator is provided to show the angular relation of the objects, the movement applied to the controlled object being suitably applied to the moving member of the indicator so as to return it to zero. Such a system is shown for example in U. S. Patent No. 1,040,161 to Dawson and Buckham, and is sometimes known as "zero reader" system. My invention, however, has obviously various other applications. It has particular application where the moving member of the indicator is in the form of a drum or dial which may be suitably graduated and read against a stationary mark. It is sometimes desirable or necessary to enclose the indicator in a casing so that only a small portion of the moving member in the vicinity of the stationary mark is visible. In such case, when the zero mark of the moving member is not in view, a mental calculation must be made from the observed graduations to determine the proper direction of movement required to return the moving member to zero.

In carrying out my invention I provide a series of marks on the moving member of the indicator for designating the direction in which the member must be moved to bring it back to zero. These marks are also arranged to give a rough indication of the required movement.

Figure 1:
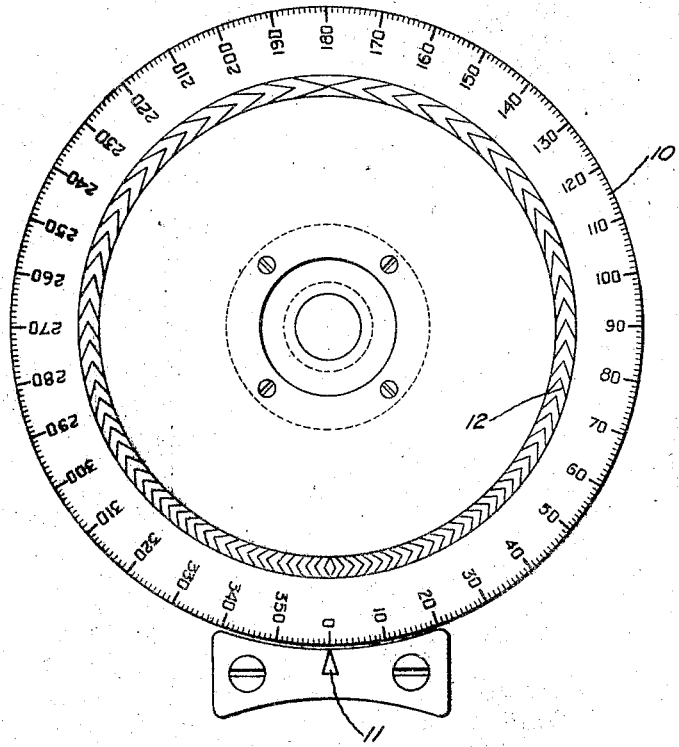
Figure 2:
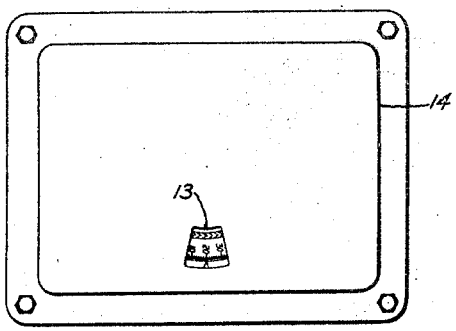

For a more complete understanding of my invention reference should be had to the accompanying drawing in which Fig. 1 is a plan view of an indicating dial embodying my invention; while Fig. 2 is a plan view showing the dial of Fig. 1 embodied in an instrument with only a small portion of the dial in view.

Referring to the drawing, I have shown my invention in one form as applied to an indicating dial 10. It should be understood, however, that my invention is equally applicable to rotary indicating members of various other forms, such as drum-shaped. The dial 10 is provided with suitable scale markings around its periphery. As shown, the dial is graduated in degrees. Cooperating with the dial is a stationary reference mark 11. In one of its applications, the dial may be driven to indicate the angular position of a controlled object with respect to a controlling object. For example, the dial may be driven by a suitable motion repeater device, suitable means being provided to turn the dial to zero position when the controlled object is moved into angular agreement with the controlling object. In short, the dial may show the angular position of a controlled object with relation to a controlling object, and when the controlled object has been moved into angular agreement with the first, the dial stands on zero. Obviously when the entire dial is in view the direction to zero position can be determined at a glance.

In case it is desirable or necessary for various reasons to have in view a relatively small section of the dial only, then it will be observed that the direction to zero position must be calculated from the graduations in view. This obviously requires a certain amount of mental effort. Errors and delays may therefore result. In accordance with my invention I suitably inscribe a series of pointers or V-shaped marks 12 around the dial. The points of the V-shaped marks indicate the direction of the required movement of the dial to zero position. Starting from zero position, it will be observed that the marks point in opposite directions and meet at 180°. The lengths of the marks are made proportional to the angular distance from zero position, and also the angle of the marks becomes more acute as the distance from zero position increases. It will also be observed that the marks point away from zero and toward the oppositely situated 180° position. With the dial thus marked the operator can instantly determine without mental effort the direction of movement to be applied to the dial. For example, in case the dial indicates an angle of 20 degrees, as shown in Fig. 2, the V-shaped marks indicate that the movement of the dial should be counter-clockwise in order to return it to zero. An indication of the amount of the required movement is given by the length and also the angle of the V-shaped marks.

While I have described my invention as embodied in concrete form and as operating in a specific manner in accordance with the provisions of the patents statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. An indicator comprising a movable member, a cover therefor provided with an aperture through which a portion of said member is visible, and a series of marks on the portion of said member moving under said aperture arranged to indicate the direction of movement required to bring said member to a predetermined position.

2. An indicator comprising a movable member, a cover therefor provided with an aperture through which a portion of said member is visible, and a series of marks on the portion of said member moving under said aperture arranged to indicate the direction of movement required to bring said member to a predetermined position and varying in size so as to show the amount of said required movement.

3. An indicator comprising a movable member, a cover therefor provided with an aperture through which a portion of said member is visible, and a series of pointed marks on said portion of said member, said marks being relatively arranged to indicate the amount and direction of movement required to bring said member to a predetermined position.

4. An indicator comprising a rotatable graduated indicating dial, a stationary mark, a casing for said dial provided with an aperture through which a portion of said dial is visible, and marks on said dial for indicating the direction and amount of movement required to bring the dial to zero position.

5. An indicator comprising a rotatable graduated indicating dial, a casing for said dial provided with an aperture through which a portion of said dial is visible, and a series of V-shaped marks on said dial pointing in the direction of movement required to bring the dial to zero position, the angle of said V-shaped marks varying with the distance from zero position.

In witness whereof, I have hereunto set my hand this 29th day of October, 1923

EDWIN J. MURPHY.